Feb. 26, 1929.  W. H. PIERSON  1,703,541
SPOT WELDING APPARATUS
Filed Nov. 1, 1926
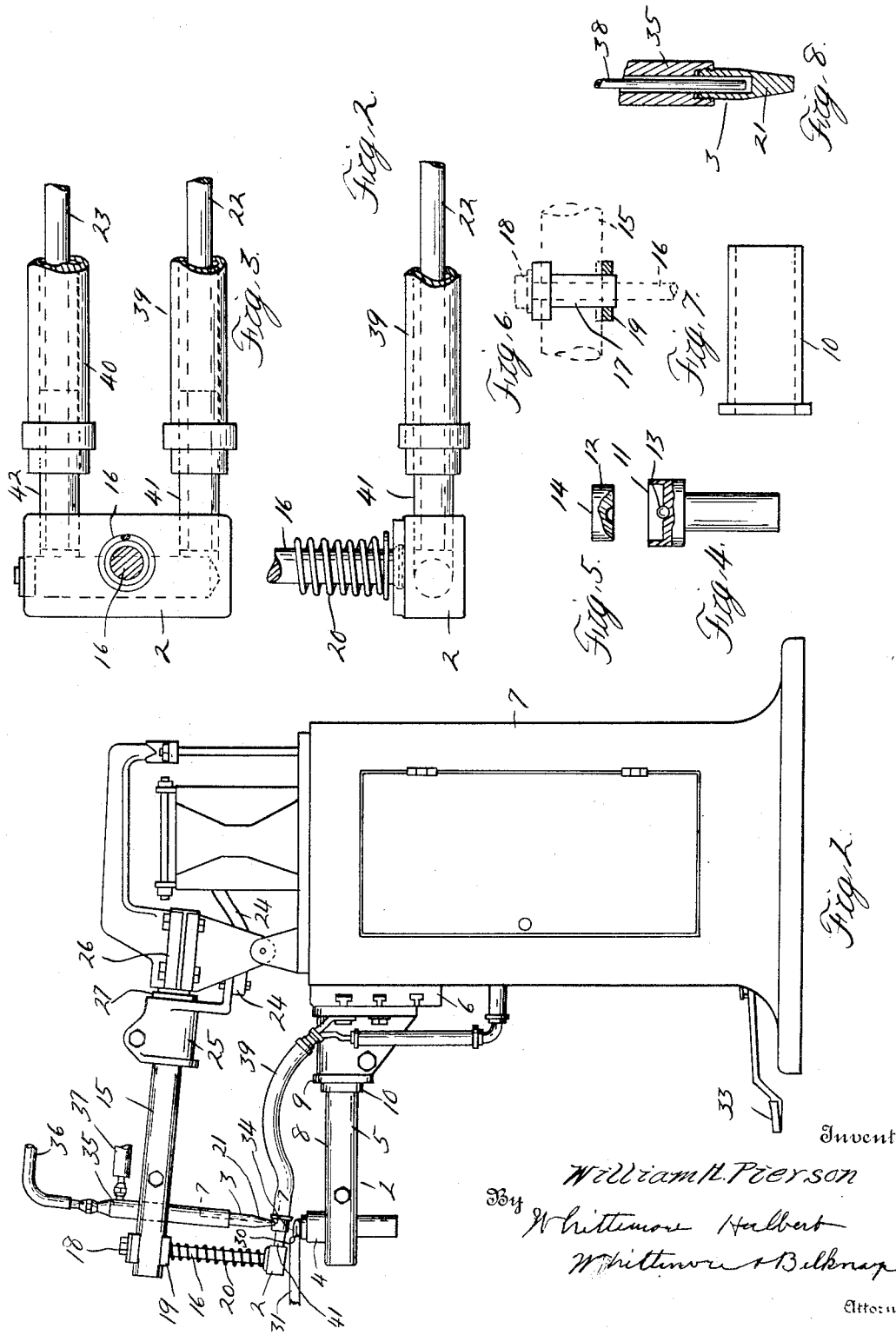
Inventor
William H. Pierson
By Whittemore Hulbert
Whittemore & Belknap
Attorneys Patented Feb. 26, 1929.

1,703,541

UNITED STATES PATENT OFFICE.

WILLIAM H. PIERSON, OF DETROIT, MICHIGAN, ASSIGNOR TO BRIGGS MANUFACTURING COMPANY, OF DETROIT, MICHIGAN, A CORPORATION OF MICHIGAN.

SPOT-WELDING APPARATUS.

Application filed November 1, 1926. Serial No. 145,537.

This invention relates generally to welding apparatus and consists of certain novel features of construction, combinations and arrangements of parts as will be more fully described and particularly pointed out in the appended claims.

In the accompanying drawings:

Figure 1 is a side elevation of an apparatus embodying my invention.

Figure 2 is an enlarged fragmentary side elevation thereof.

Figure 3 is a top plan view of the construction shown in Figure 2.

Figure 4 is a detail elevation of the upstanding arm of the work support.

Figure 5 is a detail elevation of the bearing seat.

Figure 6 is a fragmentary elevation of the movable electrode supporting arm and showing the adjustable electrode rod applied thereto.

Figure 7 is a detail elevation of the sleeve used to insulate the electrode supporting arm and the work support from the main frame of the apparatus.

Figure 8 is a fragmentary vertical sectional view taken on the line 8—8 of Figure 1.

Referring now to the drawings, 1 is a work support, and 2 and 3 respectively are welding electrodes of a welding apparatus embodying my invention. As shown, the work support 1 has an upstanding arm 4 that constitutes a seat for the work, and has a substantially horizontal arm 5 that is rigidly secured to a saddle 6 on the main frame 7 of the apparatus. Preferably this horizontal arm 5 is formed of two sections 8 and 9 respectively that are insulated from each other by a suitable flanged sleeve 10 of non-conducting material, while the upstanding arm 4 is preferably rigid with the horizontal arm 5 but is provided at its upper end with an upwardly opening recess 11 in which a seat 12 for the work is adjustably mounted. As shown, this seat 12 rests upon a ball 13 in the recess 11 and has a flat upper face 14 upon which the work is adapted to rest. Thus the seat 12 may adjust itself upon the ball 13 so that the flat face 14 will assume the proper angular position with respect to the arm 4 to provide the proper bearing for the work, and thereby prevent the work from being dented or otherwise damaged when applied to the seat.

In the present instance the welding is effected indirectly through the work, hence both electrodes 2 and 3 are preferably carried by and are movable with a common supporting arm 15 which in turn is pivotally mounted upon the main frame 7 of the apparatus. As shown the electrode 2 comprises an apertured block and is suitably connected to the lower end of a vertically adjustable rod 16 carried by the outer end of the arm 15. Preferably this rod 16 passes freely through the arm 15 and is insulated therefrom by a suitable flanged sleeve 17 of non-conducting material. A nut 18 is secured upon the rod 16 above the arm 15 to limit the downward movement of the rod, while a suitable washer 19 also of insulating material is fastened upon the rod 16 below the arm 15 to limit the upward movement of the rod 16. Any suitable means such as the coil spring 20 sleeved upon the rod 16 between the electrode 2 and washer 19 may be used to normally maintain the electrode 2 in lowered position. However the arrangement is such that this spring will permit the electrode 2 to yield slightly to compensate for work of varying thicknesses. Preferably the electrode 3 is pencil like in form and is rigidly secured in the arm 15 adjacent to the rod 16. To provide an efficient construction the welding point 21 of this electrode 3 is removable and preferably terminates a slight distance above the lower work engaging face of the block electrode 2.

Any suitable means such as the electrical conductors 22, 23 and 24 respectively may be used to carry the current from the usual transformer in the frame 7 to the electrodes 2 and 3 respectively. As shown the conductors 22 and 23 preferably lead from the saddle 6 and are terminally connected to the electrode 2, while the conductor 24 leads from the transformer in the frame 7 to a suitable collar 25 on the pivotally mounted arm 15. Preferably this collar 25 is insulated from the inner pivoted end portion 26 of the arm by means of a suitable flanged collar 27 of non-conducting material. Hence, the current will flow from the conductor 24 through the arm 15 and electrode 3 to the point 21, and will flow from the conductors 22 and 23 direct into the block electrode 2.

In use, the metal parts to be welded together, such as for instance the frame 30 and outer panel 31 of an automobile door are first positioned upon the work support as shown in Figure 1, whereupon the usual operating pedal 33 may be actuated to cause the electrodes 2 and 3 to engage the work. When this pedal 33 is actuated the arm 15 will move downwardly so that the electrode 3 will engage a return-bent flange 34 of the outer panel and the electrode 2 will engage the uppermost face of the frame 30, hence the current will flow through the frame 30 and flange 34 to effect the welding operation between said flange and frame.

Heretofore the flange 34 has been welded to the frame of the door by electrodes that were located in substantial alignment above and below the door, hence contact of the lower electrode with the outer panel would cause the said panel to be dented, scratched or otherwise marred so that a separate finishing operation, usually in the form of a filing operation, was necessary to remove such disfigurations from the outer panel. However with the present invention there is no contact whatever of any of the electrodes with the outer panel, hence the said panel cannot be disfigured and such separate finishing operations have been dispensed with entirely. As a result a considerable saving in time, labor and expense has been effected. Moreover the original exterior surface of the panel has been preserved.

If desired the electrode 3 may be cooled by water which is conveyed to and from the holder 35 of said electrode by suitable conduits 36 and 37 respectively, water being free to circulate around the conductor 38 within the holder 35 to cool the point 21. Water conduits 39 and 40 respectively may also be used to cool the electrical conductors 22 and 23 respectively. As shown these conduits 39 and 40 surround the conductors 22 and 23 and are terminally secured to short lengths 41 and 42 respectively of pipe that in turn are threaded into the block electrode 2.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a welding apparatus, the combination with a main frame, of a work support projecting from said frame and insulated therefrom, a pair of electrodes above said work support for engagement with the work, a supporting arm for said electrodes pivotally mounted on said frame and insulated therefrom, an electrical conductor connected to said arm, and an electrical conductor connected to one of said electrodes, said electrode being insulated from said supporting arm.

2. In a welding apparatus, the combination with a main frame, of a work support projecting therefrom, cooperating electrodes movable toward said support to engage the work to effect a welding operation, a supporting arm for said electrodes pivotally mounted on said frame, one of said electrodes being rigidly connected to said arm, and the other of said electrodes being adjustably connected to said arm.

3. In a welding apparatus, the combination with a main frame, of a work support projecting from said frame and insulated therefrom, a pair of electrodes engageable with the work to effect a welding operation, a supporting arm for said electrodes carried by said frame and insulated therefrom, one of said electrodes being rigidly secured to said arm, a rod connected to the other of said electrodes and adjustably mounted in said arm, an electrical conductor connected to said arm for supplying a current to the first mentioned electrode, and an electrical conductor connected to the second mentioned electrode, said rod being insulated from said supporting arm.

4. In a welding apparatus, the combination with a work support, of a pair of cooperating electrodes movable toward said support to effect a welding operation, one of said electrodes being apertured, electrical conductors connected to said apertured electrode, and means for cooling said conductors and apertured electrode including lengths of pipe connected to said apertured electrode, and tubing surrounding said conductors and connected to said pipes whereby a cooling fluid will flow along said conductors and through said pipes into the apertured electrode.

5. In a welding apparatus, the combination with a main frame, and a work support projecting from the frame, of an arm pivoted on the frame and movable toward and from the work support, a pair of laterally spaced electrodes carried by said arm and movable as a unit therewith to engage work on said support, one of said elements being adjustably connected to said arm and normally below the other element so that it may engage the work in advance of the other element and remain in such engagement while the other element is moving toward the work to close the circuit through the work laterally to the other element.

6. In a welding apparatus of the class described, the combination with a swinging support arm, of an electrode rigidly secured to said arm and having a pointed work engaging end portion, a second element at one side of the electrode aforesaid, and a connection between the second mentioned electrode and arm including a rod substantially parallel to the first-mentioned electrode and movable relative to said arm.

7. In a welding apparatus of the class described, the combination with a swinging supporting arm, of two laterally spaced electrodes carried by and movable with said arm to engage one side of the work, one of said electrodes being pencil-like in form and rigid with said arm, the other being in the form of a plug, and a connection between said plug and arm including a rod movable transversely of said arm, and yieldable means on said rod between said arm and plug normally holding said plug and rod in extended position with respect to said arm.

In testimony whereof I affix my signature.

WILLIAM H. PIERSON.